Feb. 7, 1961 T. S. HOLMES 2,970,792
AIRCRAFT LANDING GEAR
Filed Sept. 28, 1956 2 Sheets-Sheet 1
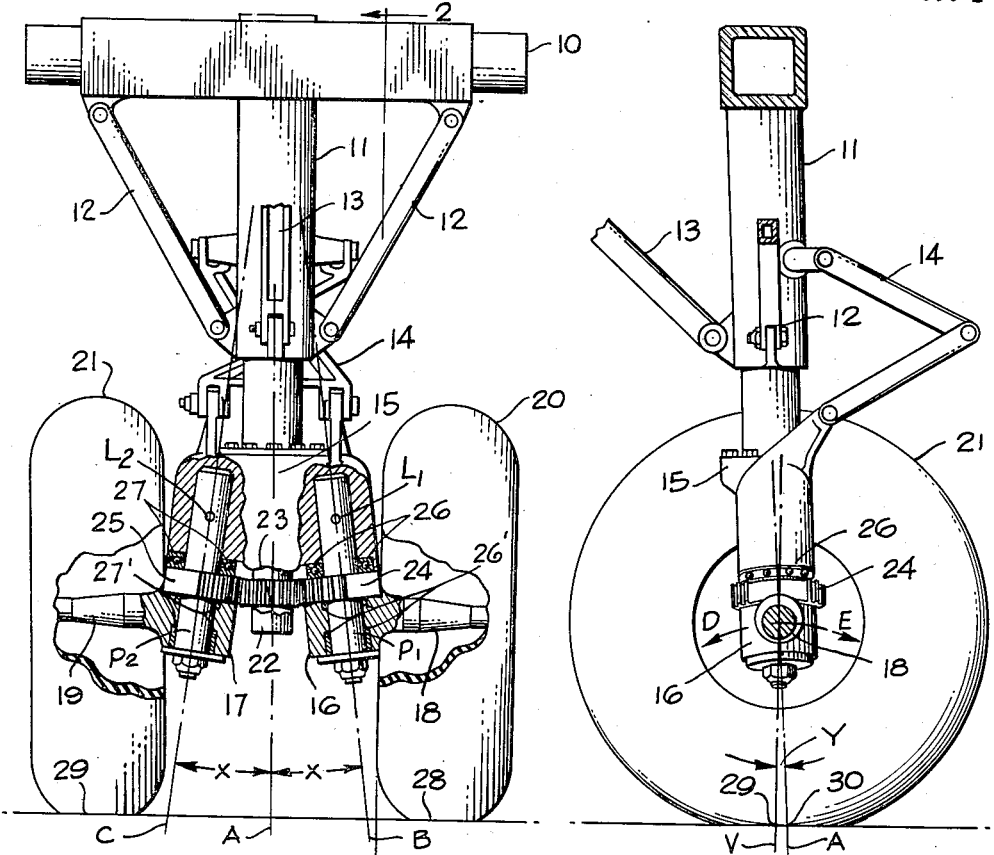
FIG. 1.
FIG. 2.
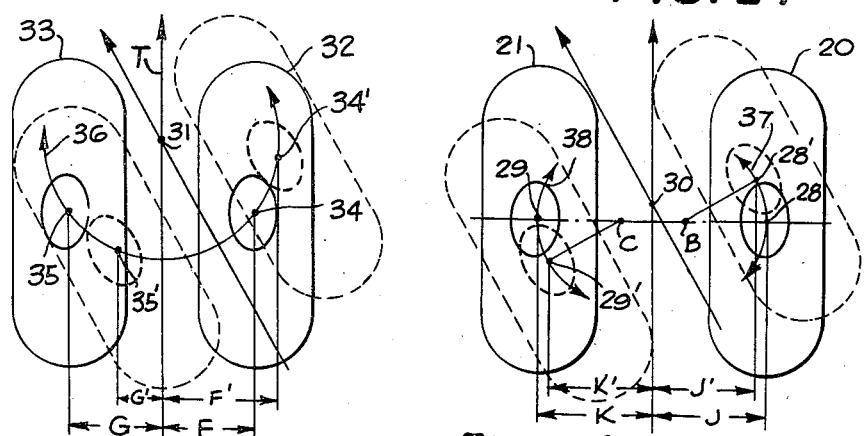
FIG. 3.
FIG. 4.
INVENTOR.
TRACY S. HOLMES
BY Elliott & Pastoriza
ATTORNEYS United States Patent Office 2,970,792
Patented Feb. 7, 1961

2,970,792

AIRCRAFT LANDING GEAR

Tracy S. Holmes, 649 Hightree Road,
Santa Monica, Calif.

Filed Sept. 28, 1956, Ser. No. 612,752

2 Claims. (Cl. 244—50)

This invention relates generally to aircraft landing gear and more particularly to an improved nose wheel steering mechanism for aircraft equipped with tricycle landing gears.

Conventional landing gears embody, in principle, the characteristics of bicycles and industrial casters in order to achieve directional stability. Essentially, such directional stability is attained by positioning the effective forward driving force on the wheel axle ahead of the point of contact of the wheel base with the ground. In other words, the contact point of the wheel with the ground, and thus the drag force, is behind the effective pulling force on the wheel so that a trailing effect is achieved. With the drag force acting at a point to the rear of the impelling forward force on the wheel, any turning or lateral displacement of the wheel immediately establishes unbalanced force moments tending to align the drag force behind the impelling force. By such an arrangement, therefore, when the wheel is driven in a forward direction, any irregularities in the road or runway tending to turn the wheel will result in the establishment of unbalanced force moments acting to again align the wheel in a fore and aft direction so that it will be maintained on a straight and true course.

In conventional bicycles, the above referred to trailing effect is achieved by inclining the turning axis of the wheel in the fore and aft plane such that the projected turning axis extends downwardly and forwardly to intercept the ground at a point forward of the actual physical contact point of the wheel with the ground. In the case of industrial casters, the turning axis for the caster is vertical but is physically positioned forward of the wheel axle such that the wheel contact point with the floor is offset to the rear of the forward driving force acting on the caster.

A primary disadvantage of relying principally on the trailing effect to achieve directional stability is the tendency for the wheel to shimmy at high speeds. Such shimmy is a direct result of the trailing effect. Generally, the difference or unbalance of the drag force moments varies with the degree of turning of the wheel. As a consequence, the unbalance of the force moments decreases the closer the wheel approaches proper alignment and this difference or unbalance is essentially reduced to zero when the wheel reaches alignment. Because of the inertia of the wheel, however, it will tend to overshoot the properly aligned position and turn in the other direction. This turning in the other direction then sets up unbalanced force moments in the opposite direction tending to again align the wheel and again the wheel tends to overshoot whereby it will oscillate on either side of its true forward direction. This oscillation constitutes shimmy and may increase to such an extent as to cause loss of control as well as vibrational and structural damage to the aircraft, especially at high speeds. Other factors such as wheel unbalance, loose joints, and tire design will influence shimmy, but the basic cause thereof is as outlined above. Further, the greater the trailing effect, the greater will be the tendency for this shimmy action. Decreasing of the trailing effect by shortening the offset distance of the effective impelling force with respect to the drag contact point will lessen the tendency for shimmy, but correspondingly will also decrease the directional stability of the wheel.

Bearing the above in mind, it is a primary object of the present invention to provide an improved landing gear construction in which shimmy characteristics are essentially eliminated.

More particularly, an object is to provide an improved aircraft landing gear which is simple, sturdy, and dynamically stable and in which no shimmy damping apparatus is necessary whereby the gear is lighter in weight than conventional gear.

Still another object is to provide a directionally stable aircraft steering gear of the above type in which the steering torque requirements are less than characterize conventional landing gears.

Still another object is to provide an improved landing gear system suitable for enabling safe cross-wind landings and take-offs by aircraft.

Briefly, these and other objects and advantages of the present invention are attained by embodying a new principle in landing gear construction to provide the desired directional stability whereby the trailing effect is of only secondary importance and thus shimmy is essentially eliminated by eliminating the cause of shimmy. More particularly, directional stability is achieved by inclining the turning axis for the landing wheel in a direction lateral to the fore and aft plane of the wheel such that turning of the wheel will change the level of the wheel axle such as to lift the aircraft to a higher level. The weight of the aircraft, therefore, tends to maintain the wheel in perfect fore and aft alignment since the structure will statically seek its lowest level. In a preferred embodiment of the invention, dual wheels are provided in side by side relationship and a central steering mechanism extends downwardly between the wheels with its central axis inclined slightly in a fore and aft plane to provide a small virtual trailing effect. This central steering mechanism is coupled to individual turning means associated with each of the wheels to turn these wheels about axes converging towards each other so that the effect described heretofore dominates any slight shimmy characteristics as a result of the virtual trailing effect. Inasmuch as the virtual displacement of the steering mechanism axis forward of the contact point of the wheels of the ground is quite small, as compared with conventional landing gear, the torque required for turning the wheels is considerably less than in conventional landing gear. This decreased torque is a result of the relatively short turning radius for the wheels.

A better understanding of the invention will be had by referring to a preferred embodiment thereof as illustrated in the accompanying drawings, in which:

Figure 1 is a rear elevational view of a nose wheel landing gear constructed in accordance with the present invention, looking in a forward direction;

Figure 2 is a side elevational view partly in section of the gear taken in the direction of the arrows 2—2 of Figure 1;

Figure 3 is a schematic illustration of various force moments established upon turning conventional type landing gear;

Figure 4 is a schematic illustration similar to Figure 3 illustrating force moments established as a result of turning of the landing gear of the present invention; and, Figure 5 illustrates one type of power drive mechanism which may be employed if desired for positively turning the wheels of the landing gear of Figure 1.

Figure 5:
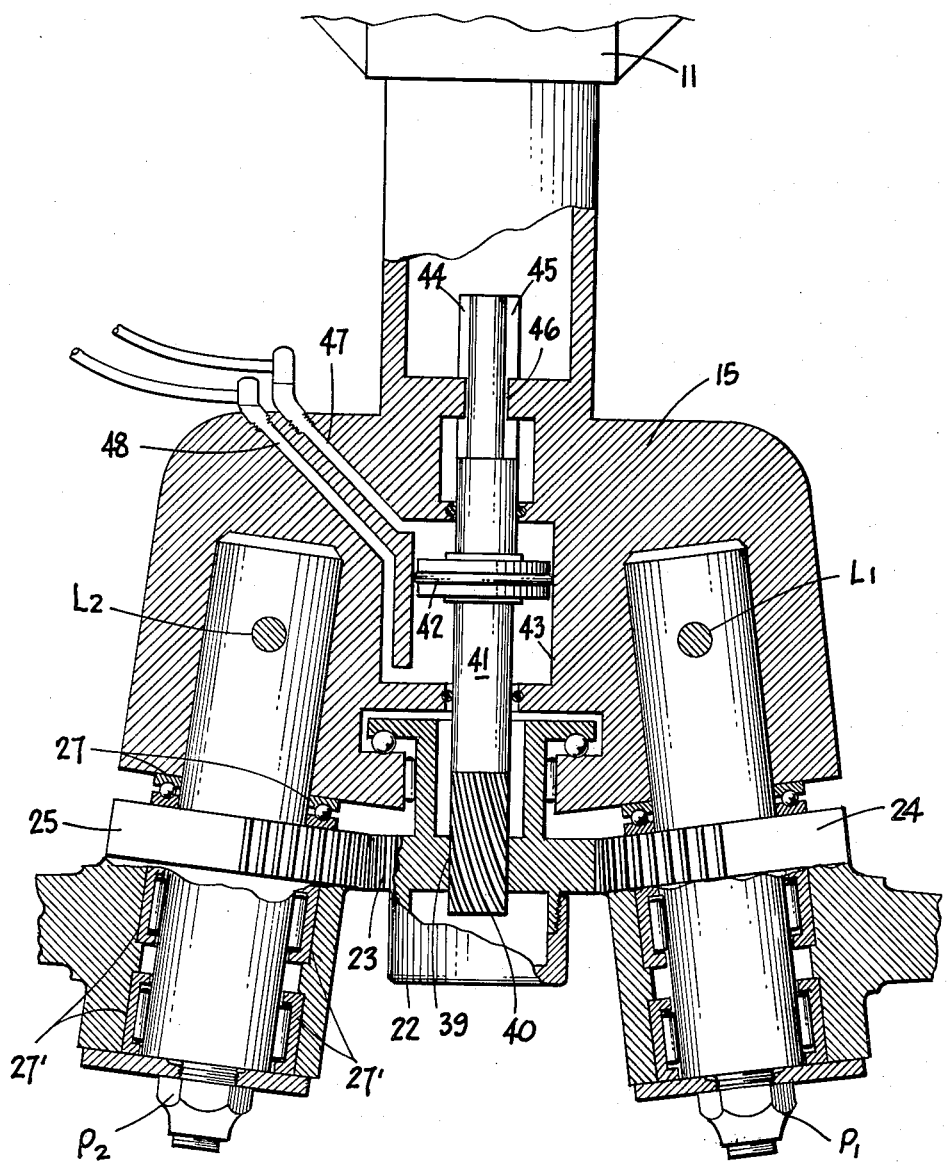

Referring to both Figures 1 and 2, there is illustrated, at the upper portion of the drawing, a conventional trunnion pivot 10 coupled to the nose portion of an airplane (not shown) whereby the landing gear may be retracted within the fuselage of the aircraft by rotation about a horizontal axis. A conventional shock strut 11 extends downwardly from the pivot trunnion and is stabilized with respect thereto by conventional lateral struts 12. A lower drag link 13 is also illustrated together with conventional torque links 14 for preventing relative rotation between the telescoping portions of the shock strut 11.

At the lower end of the shock strut 11, there is provided a stationary housing 15 for supporting a steering drive mechanism including axle gear knuckles 16 and 17 integrally formed with wheel axles 18 and 19. The wheel axles and axle gear knuckles 16 and 17 are rotatably mounted about stationary kingpins $P_1$ and $P_2$ fitted within the housing. These kingpins are retained in the housing 15 by lock pins $L_1$ and $L_2$ passing transversely therethrough and into the housing as shown. Axles 18 and 19 in turn rotatably mount a pair of wheels 20 and 21 respectively. The extreme lower end portion of the steering housing 15 includes a coupling mechanism housing 22 including a coupling gear 23 having a central axis coinciding with the axis of the shock strut 11. Each of the axle gear knuckles 16 and 17 include suitable coupling sector gears 24 and 25 rigidly secured to the axle gear knuckles and respectively engaging opposite sides of the coupling gear 23 so that upon rotation of one of the gears 24 and 25, the other will be rotated in a like direction through the medium of the gear 23.

It will be noted from Figure 1, that the individual turning axes B and C for each of the wheels 20 and 21 converge upwardly together to form equal angles X with the strut axis A. Coupling gear 23 is, therefore, preferably a bevel gear having a bevel angle corresponding to X while gears 24 and 25 may be conventional spur gear sectors. The strut axis A and turning axes B and C all lie in the same plane which in turn is inclined slightly with respect to the vertical as shown in Figure 2. Suitable bearings are provided at 26, 26' and 27, 27' for the axle gear knuckles 16 and 17 respectively, whereby these knuckles together with the gears 24 and 25 may rotate about the kingpins $P_1$ and $P_2$ and thus axes B and C. If desired and as will be described in connection with Figure 5, a power steering mechanism may be provided within the lower coupling mechanism casing 22 for driving the gear 23. Otherwise gear 23 simply serves as an idler gear between gears 24 and 25.

In Figure 2, the inclination of the central axis A of the shock strut 11 and driving gear in a fore and aft plane with respect to the vertical axis V is clearly illustrated. This inclination forms an angle Y with respect to the vertical axis such that the projection of axis A intercepts the ground slightly ahead of the wheel contact points 28 and 29, as indicated at 30. The effective impelling or forward force tending to move the wheels in a forward direction is therefore slightly forward of the drag forces experienced by the wheels at the contact points 28 and 29 so that a slight trailing effect is achieved by inclining the axis A with respect to the vertical axis V.

As a consequence of the inclination inwardly towards each other of the axes B and C as depicted in Figure 1 by the angle X, the axles 18 and 19 of the wheels 20 and 21 will describe a locus indicated by the arc DE in Figure 2 when the wheels are turned to the right or left. The raising and lowering of the axles upon turning the wheel as shown by the arc DE results from the inward or lateral inclination of the turning axis of each wheel. Since the distance between the axle, such as axle 18, and ground must necessarily remain constant, it will be evident that when the wheels 20 and 21 are turned to the right or left, the action of the moving axle over the arc DE will result in a lifting of the entire nose portion of the aircraft. Since the weight of the aircraft tends to seek its lowest position, the wheels 20 and 21 will therefore be in static equilibrium only when they are facing in a fore and aft direction for normal straight line travel. In other words, the top point of the arc DE in Figure 2 represents the normal rest point for the axle 18 and it is in this position that the wheels 20 and 21 are facing forward.

The advantages of the above described construction during operation of the aircraft nose gear steering arrangement of this invention, will be evident by referring to Figures 3 and 4. Figure 3 illustrates schematically a plan view of a conventional type aircraft landing gear in which the projected steering axis 31 for the wheels 32 and 33 has a virtual forward displacement from the contact points 34 and 35 of an appreciable distance to provide a trailing effect. The oval shaped patterns having contact centers at 34 and 35 define the footprint areas of the wheels. The points 34 and 35 represent the center of action of the drag forces on the wheels and the moment arms F and G of these forces with respect to the forward driving force exerted at 31 are equal when the wheels are aligned in a fore and aft direction.

Assuming the wheels 32 and 33 are moving forwardly, in the direction of the arrow T, and that a slight depression or object in the path of the wheels causes them to momentarily turn in a counterclockwise direction to the position indicated in dotted lines, lateral force moments will be established tending to re-align the wheels in a forward direction. The moment arms for these force moments are indicated at F' and G' respectively in Figure 3 and are measured from the new wheel contact points 34' and 35'. As shown, the moment arm F' is much larger than the moment arm G' whereby the drag force moment of wheel 32 is more effective than the drag force moment of wheel 33 and will tend to rotate the wheels in a clockwise direction to return them towards the solid line position. It will be evident that as the wheels turn towards the solid line position, the moment arms F' and G' approach the same length. The difference between the moment arms F' and G' therefore diminishes as the wheels approach alignment. However, because of the inertia of the wheels, they will tend to rotate past their center position and thus set up unbalanced moment arms on the other side of the forward direction. The wheels will then be returned to center and overshoot a second time, oscillating back and forth. As mentioned briefly heretofore, these oscillations are defined as shimmy and may become quite pronounced at very high speeds.

Referring now to Figure 4, a similar schematic diagram is illustrated for the landing gear of the present invention illustrated in Figures 1 and 2. As shown in Figure 4, the projection of the effective steering axes B and C to the ground is indicated at 30 which is only slightly ahead of the contact points 28 and 29 for the tires 20 and 21. However, the actual turning axes B and C for the respective wheels pass through the transverse axes of the wheels such that each of the wheels individually swing in a small arc as indicated at 37 and 38. The result is that the moment arms J and K and J' and K' established upon inadvertent turning of the wheels to the dotted line position, remain substantially equal. Therefore, the drag force moments are substantially equal and the side force components will substantially cancel each other at all times. Thus, no appreciable restoring force moments are created as a result of the trailing effect. Rather, the wheels are returned to the fore and aft direction as a result of the weight of the aircraft and the tendency for the wheels to turn such as to lower this weight to a position in which it is in static equilibrium, as described in connection with the arc DE defining the locus of the wheel axles in Figure 2. Because of the maintenance of substantially equal moment arms J and K regardless of the particular turned position of the wheels, no harmful shimmy is possible since the basic cause of the shimmy has been substantially eliminated.

It will be clear from an inspection of Figure 4 that the radius arms through which the wheels are turned, that is, the distance between the points B and C and the contact points 28 and 29, is considerably less than the radius arm for conventional gear extending from the point 31 to 34 and 35 of Figure 3 so that there is less actual movement of the contact areas of the tires with the ground in the former than in the latter case. Thus, the necessary turning torque is greatly diminished so that any power steering unit employed may be kept small. With power steering incorporated, the weight of the present landing gear would not exceed that of conventional type landing gears employing a shimmy damper.

By way of illustration of a simple power steering mechanism for positively turning the gear 23 of Figure 1, reference is had to Figure 5. As shown in Figure 5, the housing 22 and gear 23 are provided with a hollow interior the inner portion of the gear 23 being provided with angulated threads 39 co-operating with spiraled splines 40 on the lower end portion of a driving piston 41. Driving piston 41 includes a piston head 42 reciprocal up and down within a cylindrical bore 43 in the housing 15. The upper end of the piston 41 is provided with straight longitudinal grooves 44 and 45 co-operating with guide lands 46 formed in the housing structure 15. Suitable hydraulic fluid conduits 47 and 48 pass through the housing 15 to the cylindrical bore 43 above and below the piston head 42 respectively.

By the foregoing construction, it will be evident that hydraulic fluid pressure transmitted through the conduit 47 or 48 will cause the piston head 42 and piston rod 41 to move down or up as the case may be. Downward or upward movement of the piston rod 41 will in turn cause a rotation of the gear 23 in one direction or the other as a consequence of the spiraled splines 40 and intermeshing threads 39. Rotation of the gear 23 in one direction or the other will rotate the gears 24 and 25 to in turn individually turn the wheels of the landing gear as described heretofore.

The foregoing structure merely illustrates by way of example one means for positively rotating the gear 23. Other equivalent structures could, of course, be employed. As mentioned heretofore, the device may simply constitute a free wheeling structure wherein the gear 23 would simply serve as an idler gear to synchronize movements between the gears 24 and 25. In this event, the piston rod 41, piston head 42, cylindrical bore 43, etc. would not be necessary and the gear 23 would simply be driven in one direction or the other upon turning movements of the wheels as might be caused by depressions or projections in the runway.

An important advantage is provided as a result of the slight virtual trailing effect incorporated in this invention. Note in Figure 2 that the weight of the aircraft will be vertically directed downwardly along the axis V. When the aircraft is in motion, the drag forces will be acting at the point 29. Assuming for the moment that there were no virtual trailing effect so that the steering axis A coincided with the vertical axis V as viewed in Figure 2, the presence of the drag forces would be overcome by a forward impelling force acting on the axle 18 such as to result in a dynamic equilibrium balance of forces at a point slightly behind the top center point of the arc DE. The wheel axles would therefore tend to seek this point and as a result of the inward inclination of their separate axes, they would tend to toe outwardly.

Because of the slight inclination of the steering axis A in a fore and aft plane, however, there is provided a forward force component that will exactly balance the drag forces such that the point of dynamic equilibrium will fall at the highest vertical point of the arc DE above the ground. This positioning is a result of the fact that the center of the radius defining arc DE lies on the axis A and not on the axis V. Since both the drag forces and this forward component of the impelling force vary directly with the load on the wheels they will remain in balance at all times and there will be no tendency for the wheels to toe out when the aircraft is in motion.

It will be evident from the herein described construction that the main landing gear may be constructed similarly to the nose gear and thus positioned for cross-wind landings and take-offs.

It will thus be seen that the present invention provides a greatly improved aircraft landing gear which is relatively simple and rugged in construction, statically and dynamically stable and in which the tendency to shimmy has been substantially eliminated.

Modifications within the scope and spirit of the present invention will occur to those skilled in the art. The improved landing gear is, therefore, not to be thought of as limited to the specific example chosen for illustrative purposes.

What is claimed is:

1. An aircraft landing gear comprising, in combination: a pair of wheels; a central housing including a steering coupling mechanism disposed between said wheels and having a central axis inclined in a fore and aft plane such that projection of said axis intercepts the ground at a given angle at a point forward of the center of contacts of the wheels with the ground; individual axles mounting said wheels for rotation respectively; and individual turning means rotatably mounted to said housing and connected to said axles respectively, said turning means also being coupled to said steering coupling mechanism for turning said wheels about separate turning axes converging towards each other in an upward direction, said turning axes also lying in a plane including said central axis so that said plane intercepts the ground at said given angle whereby the locus of points defining movement of said axles describe arcs, said axles being positioned at the upper portions of said arcs respectively when said wheels are aligned in a fore and aft direction.

2. A landing gear according to claim 1, in which said steering coupling mechanism includes a central gear disposed between said wheels and having its axis coincident with said central axis; and said turning means including turning gears rigidly secured to said axles and having their axes coincident with said separate turning axes respectively, said turning gears being in mechanical engagement with opposite sides of said central gear whereby rotation of said central gear rotates said turning gears in the same direction to turn said wheels simultaneously.

References Cited in the file of this patent

UNITED STATES PATENTS

| | | |
|---|---|---|
| 2,135,699 | Campbell | Nov. 8, 1938 |
| 2,600,885 | Kopfli | June 17, 1952 |
| 2,605,118 | Booth et al. | July 29, 1952 |
| 2,606,726 | Henion | Aug. 12, 1952 |
| 2,712,422 | Gerwig | July 5, 1955 |
| 2,747,817 | Saulnier | May 29, 1956 |